(12) United States Patent
Leung et al.

(10) Patent No.: US 6,712,480 B1
(45) Date of Patent: Mar. 30, 2004

(54) CONTROLLED CURVATURE OF STRESSED MICRO-STRUCTURES

(75) Inventors: Omar Leung, Palo Alto, CA (US); David T. Amm, Sunnyvale, CA (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 10/256,558

(22) Filed: Sep. 27, 2002

(51) Int. Cl.[7] .............................................. G02B 7/182
(52) U.S. Cl. ...................... 359/846; 359/224; 359/225; 359/883
(58) Field of Search ................................. 359/846, 224, 359/225, 883, 572, 573, 855, 291, 295; 385/37

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai ........................ 178/5.4 |
| 2,783,406 A | 2/1957 | Vanderhooft ................. 313/70 |
| 2,920,529 A | 1/1960 | Blythe ........................... 88/73 |
| 2,991,690 A | 7/1961 | Grey et al. ................... 88/16.6 |
| RE25,169 E | 5/1962 | Glenn |
| 3,256,465 A | 6/1966 | Weissenstern et al. ....... 317/101 |
| 3,388,301 A | 6/1968 | James ......................... 317/234 |
| 3,443,871 A | 5/1969 | Chitayat ...................... 356/106 |
| 3,553,364 A | 1/1971 | Lee .............................. 178/7.3 |
| 3,576,394 A | 4/1971 | Lee .............................. 178/7.3 |
| 3,600,798 A | 8/1971 | Lee ............................... 29/592 |
| 3,656,837 A | 4/1972 | Sandbank .................... 350/161 |
| 3,657,610 A | 4/1972 | Yamamoto et al. .......... 317/243 |
| 3,693,239 A | 9/1972 | Dix ............................... 29/470 |
| 3,743,507 A | 7/1973 | Ih et al. ........................... 96/81 |
| 3,752,563 A | 8/1973 | Torok et al. ................. 350/151 |

(List continued on next page.)

FOREIGN PATENT DOCUMENTS

| | | | |
|---|---|---|---|
| DE | 32 33 195 A1 | 3/1983 | ............ H01L/23/52 |
| DE | 43 23 799 A1 | 1/1994 | ............ H01L/23/50 |
| DE | 197 23 618 A1 | 12/1997 | ............ G03F/1/14 |
| DE | 197 51 716 A1 | 5/1998 | ............ G02B/27/14 |
| EP | 0 089 044 A2 | 9/1983 | ............ H01L/23/10 |
| EP | 0 261 901 A2 | 3/1988 | ............ G09G/3/36 |
| EP | 0 314 437 A1 | 10/1988 | ............ H01L/25/08 |

(List continued on next page.)

OTHER PUBLICATIONS

R. Apte, "Grating Light Valves for High Resolution Displays", Solid State Sensors and Actuators Workshop, Ph D. Dissertation, Stanford University (Jun. 1994).

(List continued on next page.)

*Primary Examiner*—Mohammad Sikder
(74) *Attorney, Agent, or Firm*—Haverstock & Owens LLP

(57) ABSTRACT

The current invention is directed to optical MEM devices and methods for making the same. MEM devices, in accordance with the current invention, have one or more movable micro-structures which are preferably ribbon structures or cantilever structures configured for modulating light. The movable micro-structures are patterned from a device layer comprising a silicon nitride under-layer, a reflective metal top-layer and a ceramic compensating layer. The ceramic compensating layer is provided. to reduce stress in the micro-structures which can lead to curvature. In accordance with the embodiments of the invention, the device layer is formed on a silicon substrate that is preferably etched with trenches before forming the device layer. The device layer is then patterned using lithographic masking and etching techniques to release the patterned device layer and form the movable micro-structures. Portions of the device layer which are formed over the trenches provide support for the released patterned device layer.

15 Claims, 11 Drawing Sheets

OTHER PUBLICATIONS

| | | | |
|---|---|---|---|
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Spraque et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe et al. | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |

| Patent | Date | Inventor | Class |
|---|---|---|---|
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A * | 10/1990 | Tracy et al. | 359/514 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunnaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |

| | | | |
|---|---|---|---|
| 5,162,787 A | 11/1992 | Thompson et al. ......... 340/794 |
| 5,164,019 A | 11/1992 | Sinton ........................ 136/249 |
| 5,165,013 A | 11/1992 | Faris .......................... 395/104 |
| 5,168,401 A | 12/1992 | Endriz ........................ 359/625 |
| 5,168,406 A | 12/1992 | Nelson ........................ 359/855 |
| 5,170,156 A | 12/1992 | DeMond et al. ............ 340/794 |
| 5,170,269 A | 12/1992 | Lin et al. ........................ 359/9 |
| 5,170,283 A | 12/1992 | O'Brien et al. ............. 359/291 |
| 5,172,161 A | 12/1992 | Nelson ........................ 355/200 |
| 5,172,262 A | 12/1992 | Hornbeck .................... 359/223 |
| 5,177,724 A | 1/1993 | Gelbart ..................... 369/44.16 |
| 5,178,728 A | 1/1993 | Boysel et al. ............... 156/656 |
| 5,179,274 A | 1/1993 | Sampsell ................. 250/208.2 |
| 5,179,367 A | 1/1993 | Shimizu ...................... 340/700 |
| 5,181,231 A | 1/1993 | Parikh et al. ................ 377/126 |
| 5,182,665 A | 1/1993 | O'Callaghan et al. ........ 359/95 |
| 5,185,660 A | 2/1993 | Um ............................... 358/60 |
| 5,188,280 A | 2/1993 | Nakao et al. ................ 228/123 |
| 5,189,404 A | 2/1993 | Masimo et al. ............. 340/720 |
| 5,189,505 A | 2/1993 | Bartelink .................... 257/419 |
| 5,191,405 A | 3/1993 | Tomita et al. ............... 257/777 |
| 5,192,864 A | 3/1993 | McEwen et al. ............ 250/234 |
| 5,192,946 A | 3/1993 | Thompson et al. ......... 340/794 |
| 5,198,895 A | 3/1993 | Vick ........................... 358/103 |
| D334,557 S | 4/1993 | Hunter et al. .............. D14/114 |
| D334,742 S | 4/1993 | Hunter et al. .............. D14/113 |
| 5,202,785 A | 4/1993 | Nelson ........................ 359/214 |
| 5,206,629 A | 4/1993 | DeMond et al. ............ 340/719 |
| 5,208,818 A | 5/1993 | Gelbart et al. ................ 372/30 |
| 5,208,891 A | 5/1993 | Prysner ....................... 385/116 |
| 5,210,637 A | 5/1993 | Puzey ......................... 359/263 |
| 5,212,115 A | 5/1993 | Cho et al. ................... 437/208 |
| 5,212,555 A | 5/1993 | Stoltz ......................... 358/206 |
| 5,212,582 A | 5/1993 | Nelson ........................ 359/224 |
| 5,214,308 A | 5/1993 | Nishiquchi et al. ......... 257/692 |
| 5,214,419 A | 5/1993 | DeMond et al. ............ 340/794 |
| 5,214,420 A | 5/1993 | Thompson et al. ......... 340/795 |
| 5,216,537 A | 6/1993 | Hornbeck .................... 359/291 |
| 5,216,544 A | 6/1993 | Horikawa et al. ........... 359/622 |
| 5,219,794 A | 6/1993 | Satoh et al. ................. 437/209 |
| 5,220,200 A | 6/1993 | Blanton ....................... 257/778 |
| 5,221,400 A | 6/1993 | Staller et al. ............... 156/292 |
| 5,221,982 A | 6/1993 | Faris ............................. 359/93 |
| 5,224,088 A | 6/1993 | Atiya ............................ 369/97 |
| D337,320 S | 7/1993 | Hunter et al. .............. D14/113 |
| 5,226,099 A | 7/1993 | Mignardi et al. ............. 385/19 |
| 5,230,005 A | 7/1993 | Rubino et al. ................ 372/20 |
| 5,231,363 A | 7/1993 | Sano et al. .................. 332/109 |
| 5,231,388 A | 7/1993 | Stoltz ......................... 340/783 |
| 5,231,432 A | 7/1993 | Glenn ........................... 353/31 |
| 5,233,456 A | 8/1993 | Nelson ........................ 359/214 |
| 5,233,460 A | 8/1993 | Partlo et al. ................ 359/247 |
| 5,233,874 A | 8/1993 | Putty et al. ............. 73/517 AV |
| 5,237,340 A | 8/1993 | Nelson ........................ 346/108 |
| 5,237,435 A | 8/1993 | Kurematsu et al. ........... 359/41 |
| 5,239,448 A | 8/1993 | Perkins et al. .............. 361/764 |
| 5,239,806 A | 8/1993 | Maslakow ..................... 53/432 |
| 5,240,818 A | 8/1993 | Mignardi et al. ............ 430/321 |
| 5,245,686 A | 9/1993 | Faris et al. .................. 385/120 |
| 5,247,180 A | 9/1993 | Mitcham et al. ......... 250/492.1 |
| 5,247,593 A | 9/1993 | Lin et al. ...................... 385/17 |
| 5,249,245 A | 9/1993 | Lebby et al. ................. 385/89 |
| 5,251,057 A | 10/1993 | Guerin et al. ............... 359/249 |
| 5,251,058 A | 10/1993 | MacArthur .................. 359/249 |
| 5,254,980 A | 10/1993 | Hendrix et al. ............... 345/84 |
| 5,255,100 A | 10/1993 | Urbanus ...................... 358/231 |
| 5,256,869 A | 10/1993 | Lin et al. ................. 250/201.9 |
| 5,258,325 A | 11/1993 | Spitzer et al. ................ 437/86 |
| 5,260,718 A | 11/1993 | Rommelmann et al. 346/107 R |
| 5,260,798 A | 11/1993 | Um et al. .................... 358/233 |
| 5,262,000 A | 11/1993 | Welbourn et al. ........... 156/643 |
| 5,272,473 A | 12/1993 | Thompson et al. ............. 345/7 |
| 5,278,652 A | 1/1994 | Urbanus et al. ............. 358/160 |
| 5,278,925 A | 1/1994 | Boysel et al. ................. 385/14 |
| 5,280,277 A | 1/1994 | Hornbeck .................... 345/108 |
| 5,281,887 A | 1/1994 | Engle .......................... 310/335 |
| 5,281,957 A | 1/1994 | Schoolman .................... 345/8 |
| 5,285,105 A | 2/1994 | Cain ........................... 257/672 |
| 5,285,196 A | 2/1994 | Gale, Jr. ...................... 345/108 |
| 5,285,407 A | 2/1994 | Gale et al. .............. 365/189.11 |
| 5,287,096 A | 2/1994 | Thompson et al. ......... 345/147 |
| 5,287,215 A | 2/1994 | Warde et al. ................ 359/293 |
| 5,289,172 A | 2/1994 | Gale, Jr. et al. ............. 345/108 |
| 5,291,317 A | 3/1994 | Newswanger ................ 359/15 |
| 5,291,473 A | 3/1994 | Pauli .......................... 369/112 |
| 5,293,511 A | 3/1994 | Poradish et al. ............. 257/434 |
| 5,296,408 A | 3/1994 | Wilbarg et al. ............. 437/203 |
| 5,296,891 A | 3/1994 | Vogt et al. .................... 355/67 |
| 5,296,950 A | 3/1994 | Lin et al. ........................ 359/9 |
| 5,298,460 A | 3/1994 | Nishiguchi et al. ......... 437/183 |
| 5,299,037 A | 3/1994 | Sakata .......................... 359/41 |
| 5,299,289 A | 3/1994 | Omae et al. ................... 359/95 |
| 5,300,813 A | 4/1994 | Joshi et al. .................. 257/752 |
| 5,301,062 A | 4/1994 | Takahashi et al. .......... 359/567 |
| 5,303,043 A | 4/1994 | Glenn ........................... 348/40 |
| 5,303,055 A | 4/1994 | Hendrix et al. ............. 348/761 |
| 5,307,056 A | 4/1994 | Urbanus ...................... 340/189 |
| 5,307,185 A | 4/1994 | Jones et al. ................... 359/41 |
| 5,310,624 A | 5/1994 | Ehrlich ....................... 430/322 |
| 5,311,349 A | 5/1994 | Anderson et al. ........... 359/223 |
| 5,311,360 A | 5/1994 | Bloom et al. ............... 359/572 |
| 5,312,513 A | 5/1994 | Florence et al. ............ 156/643 |
| 5,313,479 A | 5/1994 | Florence ...................... 372/26 |
| 5,313,648 A | 5/1994 | Ehlig et al. ................. 395/800 |
| 5,313,835 A | 5/1994 | Dunn ........................... 73/505 |
| 5,315,418 A | 5/1994 | Sprague et al. ............... 359/41 |
| 5,315,423 A | 5/1994 | Hong .......................... 359/124 |
| 5,319,214 A | 6/1994 | Gregory et al. ......... 250/504 R |
| 5,319,668 A | 6/1994 | Luecke ........................ 372/107 |
| 5,319,789 A | 6/1994 | Ehlig et al. ................. 395/800 |
| 5,319,792 A | 6/1994 | Ehlig et al. ................. 395/800 |
| 5,321,416 A | 6/1994 | Bassett et al. .................. 345/8 |
| 5,323,002 A | 6/1994 | Sampsell et al. ........ 250/252.1 |
| 5,323,051 A | 6/1994 | Adams et al. ............... 257/417 |
| 5,325,116 A | 6/1994 | Sampsell .................... 346/108 |
| 5,327,286 A | 7/1994 | Sampsell et al. ............ 359/561 |
| 5,329,289 A | 7/1994 | Sakamoto et al. .......... 345/126 |
| 5,330,301 A | 7/1994 | Brancher .................... 414/417 |
| 5,330,878 A | 7/1994 | Nelson ........................ 430/311 |
| 5,331,454 A | 7/1994 | Hornbeck .................... 359/224 |
| 5,334,991 A | 8/1994 | Wells et al. .................... 345/8 |
| 5,339,116 A | 8/1994 | Urbanus et al. ............. 348/716 |
| 5,339,177 A | 8/1994 | Jenkins et al. ................ 359/35 |
| 5,340,772 A | 8/1994 | Rosotker ..................... 437/226 |
| 5,345,521 A | 9/1994 | McDonald et al. ........... 385/19 |
| 5,347,321 A | 9/1994 | Gove ........................... 348/663 |
| 5,347,378 A | 9/1994 | Handschy et al. ............ 359/53 |
| 5,347,433 A | 9/1994 | Sedlmayr .................... 362/32 |
| 5,348,619 A | 9/1994 | Bohannon et al. .......... 156/664 |
| 5,349,687 A | 9/1994 | Ehlig et al. ................. 395/800 |
| 5,351,052 A | 9/1994 | D'Hont et al. ................ 342/42 |
| 5,352,926 A | 10/1994 | Andrews .................... 257/717 |
| 5,354,416 A | 10/1994 | Okudaira et al. ........... 156/643 |
| 5,357,369 A | 10/1994 | Pilling et al. ................ 359/462 |
| 5,357,803 A | 10/1994 | Lane ......................... 73/517 B |
| 5,359,349 A | 10/1994 | Jambor et al. .............. 345/168 |
| 5,359,451 A | 10/1994 | Gelbart et al. .............. 359/285 |
| 5,361,131 A | 11/1994 | Tekemori et al. ........... 356/355 |
| 5,363,220 A | 11/1994 | Kuwayama et al. ........... 359/3 |
| 5,365,283 A | 11/1994 | Doherty et al. ............. 348/743 |
| 5,367,585 A | 11/1994 | Ghezzo et al. ................ 385/23 |
| 5,371,543 A | 12/1994 | Anderson ................... 348/270 |

| Patent | Date | Inventor | Class |
|---|---|---|---|
| 5,371,618 A | 12/1994 | Tai et al. | 359/53 |
| 5,382,961 A | 1/1995 | Gale, Jr. | 345/108 |
| 5,387,924 A | 2/1995 | Gale, Jr. et al. | 345/108 |
| 5,389,182 A | 2/1995 | Mignardi | 156/344 |
| 5,391,881 A | 2/1995 | Jeuch et al. | 250/370.09 |
| 5,392,140 A | 2/1995 | Ezra et al. | 359/41 |
| 5,392,151 A | 2/1995 | Nelson | 359/223 |
| 5,394,303 A | 2/1995 | Yamaji | 361/749 |
| 5,398,071 A | 3/1995 | Gove et al. | 348/558 |
| 5,399,898 A | 3/1995 | Rostoker | 257/499 |
| 5,404,365 A | 4/1995 | Hiiro | 372/27 |
| 5,404,485 A | 4/1995 | Ban | 395/425 |
| 5,408,123 A | 4/1995 | Murai | 257/531 |
| 5,410,315 A | 4/1995 | Huber | 342/42 |
| 5,411,769 A | 5/1995 | Hornbeck | 427/534 |
| 5,412,186 A | 5/1995 | Gale | 219/679 |
| 5,412,501 A | 5/1995 | Fisli | 359/286 |
| 5,418,584 A | 5/1995 | Larson | 353/122 |
| 5,420,655 A | 5/1995 | Shimizu | 353/33 |
| 5,420,722 A | 5/1995 | Bielak | 359/708 |
| 5,426,072 A | 6/1995 | Finnila | 437/208 |
| 5,427,975 A | 6/1995 | Sparks et al. | 437/79 |
| 5,430,524 A | 7/1995 | Nelson | 355/200 |
| 5,435,876 A | 7/1995 | Alfaro et al. | 156/247 |
| 5,438,477 A | 8/1995 | Pasch | 361/689 |
| 5,439,731 A | 8/1995 | Li et al. | 428/209 |
| 5,442,411 A | 8/1995 | Urbanus et al. | 348/771 |
| 5,442,414 A | 8/1995 | Janssen et al. | 353/98 |
| 5,444,566 A | 8/1995 | Gale et al. | 359/291 |
| 5,445,559 A | 8/1995 | Gale et al. | 451/388 |
| 5,446,479 A | 8/1995 | Thompson et al. | 345/139 |
| 5,447,600 A | 9/1995 | Webb | 216/2 |
| 5,448,314 A | 9/1995 | Heimbuch et al. | 348/743 |
| 5,448,546 A | 9/1995 | Pauli | 369/112 |
| 5,450,088 A | 9/1995 | Meier et al. | 342/51 |
| 5,450,219 A | 9/1995 | Gold et al. | 359/40 |
| 5,451,103 A | 9/1995 | Hatanaka et al. | 353/31 |
| 5,452,024 A | 9/1995 | Sampsell | 348/755 |
| 5,452,138 A | 9/1995 | Mignardi et al. | 359/855 |
| 5,453,747 A | 9/1995 | D'Hont et al. | 342/42 |
| 5,453,778 A | 9/1995 | Venkateswar et al. | 347/239 |
| 5,453,803 A | 9/1995 | Shapiro et al. | 353/119 |
| 5,454,160 A | 10/1995 | Nickel | 29/840 |
| 5,454,906 A | 10/1995 | Baker et al. | 216/66 |
| 5,455,445 A | 10/1995 | Kurtz et al. | 257/419 |
| 5,455,455 A | 10/1995 | Badehi | 257/690 |
| 5,455,602 A | 10/1995 | Tew | 347/239 |
| 5,457,493 A | 10/1995 | Leddy et al. | 348/164 |
| 5,457,566 A | 10/1995 | Sampsell et al. | 359/292 |
| 5,457,567 A | 10/1995 | Shinohara | 359/305 |
| 5,458,716 A | 10/1995 | Alfaro et al. | 156/245 |
| 5,459,492 A | 10/1995 | Venkateswar | 347/253 |
| 5,459,528 A | 10/1995 | Pettitt | 348/568 |
| 5,459,592 A | 10/1995 | Shibatani et al. | 359/40 |
| 5,459,610 A | 10/1995 | Bloom et al. | 359/572 |
| 5,461,197 A | 10/1995 | Hiruta et al. | 174/52.4 |
| 5,461,410 A | 10/1995 | Venkateswar et al. | 347/240 |
| 5,461,411 A | 10/1995 | Florence et al. | 347/240 |
| 5,461,547 A | 10/1995 | Ciupke et al. | 362/31 |
| 5,463,347 A | 10/1995 | Jones et al. | 330/253 |
| 5,463,497 A | 10/1995 | Muraki et al. | 359/618 |
| 5,465,175 A | 11/1995 | Woodgate et al. | 359/463 |
| 5,467,106 A | 11/1995 | Salomon | 345/87 |
| 5,467,138 A | 11/1995 | Gove | 348/452 |
| 5,467,146 A | 11/1995 | Huang et al. | 348/743 |
| 5,469,302 A | 11/1995 | Lim | 359/846 |
| 5,471,341 A | 11/1995 | Warde et al. | 359/293 |
| 5,473,512 A | 12/1995 | Degani et al. | 361/760 |
| 5,475,236 A | 12/1995 | Yoshizaki | 257/48 |
| 5,480,839 A | 1/1996 | Ezawa et al. | 437/209 |
| 5,481,118 A | 1/1996 | Tew | 250/551 |
| 5,481,133 A | 1/1996 | Hsu | 257/621 |
| 5,482,564 A | 1/1996 | Douglas et al. | 134/18 |
| 5,482,818 A | 1/1996 | Nelson | 430/394 |
| 5,483,307 A | 1/1996 | Anderson | 353/98 |
| 5,485,172 A | 1/1996 | Sawachika et al. | 345/8 |
| 5,485,304 A | 1/1996 | Kaeriyama | 359/291 |
| 5,485,354 A | 1/1996 | Ciupke et al. | 362/31 |
| 5,486,698 A | 1/1996 | Hanson et al. | 250/332 |
| 5,486,841 A | 1/1996 | Hara et al. | 345/8 |
| 5,486,946 A | 1/1996 | Jachimowicz et al. | 359/263 |
| 5,488,431 A | 1/1996 | Gove et al. | 348/716 |
| 5,489,952 A | 2/1996 | Gove et al. | 348/771 |
| 5,490,009 A | 2/1996 | Venkateswar et al. | 359/291 |
| 5,491,510 A | 2/1996 | Gove | 348/77 |
| 5,491,612 A | 2/1996 | Nicewarner, Jr. | 361/760 |
| 5,491,715 A | 2/1996 | Flaxl | 375/344 |
| 5,493,177 A | 2/1996 | Muller et al. | 313/578 |
| 5,493,439 A | 2/1996 | Engle | 359/292 |
| 5,497,172 A | 3/1996 | Doherty et al. | 345/85 |
| 5,497,197 A | 3/1996 | Gove et al. | 348/388 |
| 5,497,262 A | 3/1996 | Kaeriyama | 359/223 |
| 5,499,060 A | 3/1996 | Gove et al. | 348/651 |
| 5,499,062 A | 3/1996 | Urbanus | 348/771 |
| 5,500,761 A | 3/1996 | Goossen et al. | 359/290 |
| 5,502,481 A | 3/1996 | Dentinger et al. | 348/51 |
| 5,504,504 A | 4/1996 | Markandey et al. | 345/214 |
| 5,504,514 A | 4/1996 | Nelson | 347/130 |
| 5,504,575 A | 4/1996 | Stafford | 356/330 |
| 5,504,614 A | 4/1996 | Webb et al. | 359/291 |
| 5,506,171 A | 4/1996 | Leonard et al. | 437/187 |
| 5,506,597 A | 4/1996 | Thompson et al. | 345/85 |
| 5,506,720 A | 4/1996 | Yoon | 359/224 |
| 5,508,558 A | 4/1996 | Robinette, Jr. et al. | 257/700 |
| 5,508,561 A | 4/1996 | Tago et al. | 257/737 |
| 5,508,565 A | 4/1996 | Hatakeyama et al. | 257/777 |
| 5,508,750 A | 4/1996 | Hewlett et al. | 348/558 |
| 5,508,840 A | 4/1996 | Vogel et al. | 359/291 |
| 5,508,841 A | 4/1996 | Lin et al. | 359/318 |
| 5,510,758 A | 4/1996 | Fujita et al. | 333/247 |
| 5,510,824 A | 4/1996 | Nelson | 347/239 |
| 5,512,374 A | 4/1996 | Wallace et al. | 428/422 |
| 5,512,748 A | 4/1996 | Hanson | 250/332 |
| 5,515,076 A | 5/1996 | Thompson et al. | 345/139 |
| 5,516,125 A | 5/1996 | McKenna | 279/3 |
| 5,517,340 A | 5/1996 | Doany et al. | 359/41 |
| 5,517,347 A | 5/1996 | Sampsell | 359/224 |
| 5,517,357 A | 5/1996 | Shibayama | 359/547 |
| 5,517,359 A | 5/1996 | Gelbart | 359/623 |
| 5,519,251 A | 5/1996 | Sato et al. | 257/666 |
| 5,519,450 A | 5/1996 | Urbanus et al. | 348/600 |
| 5,521,748 A | 5/1996 | Sarraf | 359/321 |
| 5,523,619 A | 6/1996 | McAllister et al. | 257/686 |
| 5,523,628 A | 6/1996 | Williams et al. | 257/777 |
| 5,523,803 A | 6/1996 | Urbanus et al. | 348/771 |
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |

| Patent | Date | Inventor | Class |
|---|---|---|---|
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/642 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/293 |
| 5,773,473 A | 6/1998 | Hall et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,844,711 A | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/254 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin et al. | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra et al. | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,323,984 B1 | 11/2001 | Trisnadi | 359/245 |
| 6,342,960 B1 | 1/2002 | McCullough | 359/124 |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |

| | | | |
|---|---|---|---|
| 6,396,789 B1 | 5/2002 | Guerra et al. | 369/112 |
| 6,421,179 B1 | 7/2002 | Gutin et al. | 359/572 |
| 6,445,502 B1 | 9/2002 | Islam et al. | 359/571 |
| 6,452,260 B1 | 9/2002 | Corbin et al. | 257/686 |
| 6,480,634 B1 | 11/2002 | Corrigan | 385/4 |
| 6,497,490 B1 | 12/2002 | Miller et al. | 359/614 |
| 6,525,863 B1 | 2/2003 | Riza | 359/290 |
| 6,563,974 B2 | 5/2003 | Riza | 385/18 |
| 6,565,222 B1 * | 5/2003 | Ishii et al. | 359/883 |
| 2001/0019454 A1 | 9/2001 | Tadic-Galeb et al. | 359/649 |
| 2002/0015230 A1 | 2/2002 | Pilossof et al. | 359/558 |
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |
| 2002/0112746 A1 | 8/2002 | DeYoung et al. | 134/36 |
| 2002/0131230 A1 | 9/2002 | Potter | 361/277 |

FOREIGN PATENT DOCUMENTS

| | | | |
|---|---|---|---|
| EP | 0 304 263 A2 | 2/1989 | H01L/25/065 |
| EP | 0 306 308 A2 | 3/1989 | H04N/3/14 |
| EP | 0 322 714 A2 | 7/1989 | G02B/5/30 |
| EP | 0 627 644 A3 | 9/1990 | G02B/27/00 |
| EP | 0 417 039 A1 | 3/1991 | G03B/21/20 |
| EP | 0 423 513 A2 | 4/1991 | H01S/3/085 |
| EP | 0 436 738 A1 | 7/1991 | H04N/5/74 |
| EP | 0 458 316 A2 | 11/1991 | G06K/11/06 |
| EP | 0 477 566 A2 | 4/1992 | G02B/26/08 |
| EP | 0 488 326 A3 | 6/1992 | G09G/3/28 |
| EP | 0 499 566 A2 | 8/1992 | G06F/3/033 |
| EP | 0 528 646 A1 | 2/1993 | G09G/3/02 |
| EP | 0 530 760 A2 | 3/1993 | G09G/3/34 |
| EP | 0 550 189 A1 | 7/1993 | G02F/1/315 |
| EP | 0 610 665 A1 | 8/1994 | G09G/3/34 |
| EP | 0 627 644 A2 | 12/1994 | G02B/27/00 |
| EP | 0 627 850 A1 | 12/1994 | H04N/5/64 |
| EP | 0 643 314 A2 | 3/1995 | G02B/27/00 |
| EP | 0 654 777 A1 | 5/1995 | G09G/3/34 |
| EP | 0 658 868 A1 | 6/1995 | G09G/3/34 |
| EP | 0 658 830 A1 | 12/1995 | G09G/3/34 |
| EP | 0 689 078 A1 | 12/1995 | G02B/26/08 |
| EP | 0 801 319 A1 | 10/1997 | G02B/26/00 |
| EP | 0 851 492 A2 | 7/1998 | H01L/23/538 |
| EP | 1 003 071 A2 | 5/2000 | G03B/27/72 |
| EP | 1 014 143 A1 | 6/2000 | G02B/26/08 |
| EP | 1 040 927 A2 | 10/2000 | B41J/2/455 |
| GB | 2 117 564 A | 10/1983 | H01L/26/08 |
| GB | 2 118 365 A | 10/1983 | H01L/27/13 |
| GB | 2 266 385 A | 10/1993 | G02B/23/10 |
| GB | 2 296 152 A | 6/1996 | H04N/13/04 |
| GB | 2 319 424 A | 5/1998 | H04N/13/04 |
| JP | 53-39068 | 4/1978 | H01L/23/12 |
| JP | 55-111151 | 8/1980 | H01L/27/00 |
| JP | 57-31166 | 2/1982 | H01L/23/48 |
| JP | 57-210638 | 12/1982 | H01L/21/60 |
| JP | 60-49638 | 3/1985 | H01L/21/60 |
| JP | 60-94756 | 5/1985 | H01L/25/04 |
| JP | 60-250639 | 12/1985 | H01L/21/58 |
| JP | 61-142750 | 6/1986 | H01L/21/60 |
| JP | 61-145838 | 7/1986 | H01L/21/60 |
| JP | 63-234767 | 9/1988 | H04N/1/04 |
| JP | 63-305323 | 12/1988 | G02G/1/13 |
| JP | 1-155637 | 6/1989 | H01L/21/66 |
| JP | 40-1155637 | 6/1989 | H01L/21/92 |
| JP | 2219092 | 8/1990 | G09G/3/28 |
| JP | 4-333015 | 11/1992 | G02B/27/18 |
| JP | 7-281161 | 10/1995 | G02F/1/1333 |
| JP | 3288369 | 3/2002 | G02B/26/06 |
| WO | WO 90/13913 | 11/1990 | H01L/23/10 |
| WO | WO 92/12506 | 7/1992 | G09F/9/37 |
| WO | WO 93/02269 | 2/1993 | E06B/5/10 |
| WO | WO 93/09472 | 5/1993 | G03F/7/20 |
| WO | WO 93/18428 | 9/1993 | G02B/27/00 |
| WO | WO 93/22694 | 11/1993 | G02B/5/18 |
| WO | WO 94/09473 | 4/1994 | G09G/3/34 |
| WO | WO 94/29761 | 12/1994 | G02B/27/24 |
| WO | WO 95/11473 | 4/1995 | G02B/27/00 |
| WO | WO 96/02941 | 2/1996 | H01L/23/02 |
| WO | WO 96/08031 | 3/1996 | H01J/29/12 |
| WO | WO 96/41217 | 12/1996 | G02B/5/18 |
| WO | WO 96/41224 | 12/1996 | G02B/19/00 |
| WO | WO 97/22033 | 6/1997 | G02B/27/22 |
| WO | WO 97/26569 | 7/1997 | G02B/5/18 |
| WO | WO 98/05935 | 2/1998 | G01L/9/06 |
| WO | WO 98/24240 | 6/1998 | H04N/9/31 |
| WO | WO 98/41893 | 9/1998 | G02B/26/08 |
| WO | WO 99/07146 | 2/1999 | H04N/7/16 |
| WO | WO 99/12208 | 3/1999 | H01L/25/065 |
| WO | WO 99/23520 | 5/1999 | G02B/26/08 |
| WO | WO 99/34484 | 7/1999 | |
| WO | WO 99/59335 | 11/1999 | H04N/5/765 |
| WO | WO 99/63388 | 12/1999 | G02B/27/22 |
| WO | WO 99/67671 | 12/1999 | G02B/26/08 |
| WO | WO 00/04718 | 1/2000 | H04N/7/167 |
| WO | WO 00/07225 | 2/2000 | H01L/21/00 |
| WO | WO 01/04674 A1 | 1/2001 | G02B/6/12 |
| WO | WO 01/006297 A3 | 1/2001 | G02B/27/10 |
| WO | WO 01/57581 A3 | 8/2001 | G02B/27/48 |
| WO | WO 02/025348 A3 | 3/2002 | G02B/26/02 |
| WO | WO 02/31575 A2 | 4/2002 | G02B/27/00 |
| WO | WO 02/058111 A2 | 7/2002 | |
| WO | WO 02/065184 A3 | 8/2002 | G02B/27/12 |
| WO | WO 02/073286 A2 | 9/2002 | G02B/26/08 |
| WO | WO 02/084375 A1 | 10/2002 | G02B/26/08 |
| WO | WO 02/084397 A3 | 10/2002 | G02B/27/18 |
| WO | WO 03/001281 A1 | 1/2003 | G02F/1/01 |
| WO | WO 03/001716 A1 | 1/2003 | H04J/14/02 |
| WO | WO 03/012523 A1 | 2/2003 | G02B/26/00 |
| WO | WO 03/016965 A1 | 2/2003 | G02B/5/18 |
| WO | WO 03/023849 A1 | 3/2003 | H01L/23/02 |
| WO | WO 03/025628 A2 | 3/2003 | |

OTHER PUBLICATIONS

O. Solgaard, "Integrated Semiconductor Light Modulators for Fiber–Optic and Display Applications", Ph.D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7th International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation–by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp. 255–269, 1997.

Buhler et al., "Linear Array of Complementary Metal Oxide Semiconductor Double–Pass Metal Micromirrors," Optical Engineering, vol. 36, No. 5, pp. 1391–1398, May 1997.

Gani et al., "Variable Gratings for Optical Switching: Rigorous Electromagnetic Simulation and Design," Optical Engineering, vol. 38, No. 3, pp. 552–557, Mar. 1999.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical varible blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997.pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum–Optical Components, Feb. 2001, pp. 1 of 10.

R. Plastow, "Tunable Lasers and Future Optical Networks", Forum –Tunable Lasers, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechnical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, pp. 103–115.

Olga B. Spahn, et al., "High Optical Power Handling of Pop–Up Microelectromechanical Mirrors", Sandia National Laboratories, IEEE 2000, pp. 51–52.

David M. Burns, et al. "Optical Power Induced Damage to Microelectromechanical Mirrors", Sensors and Actuators A 70, 1998, pp. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commerical CMOS Fabricated Integrated Dynamic Thermal Scene Simulator," 1991 IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M. Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50.

Jon Gildemeister, "Xenon Difluoride Etching System," 1997, UC Berkeley MicroTabrication Manual Chapter 7.15, pp. 2–5.

W. Riethmuller et al., "A smart accelerometer with on–chip electronics fabricated by a commercial CMOS process," Sensors and Actuators A. 31, (1992), 121–124.

W. Gopel et al., "Sensors–A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M. H. Hecht et al., "A novel x–ray photoelectron spectroscopy study of the Al/SiO2 interfaces," 1985 American Institute of Physics, pp. 5256–52616.

Daniel L. Flamm et al., "XeF2 and F–Atom Reactions with Si: Their Significance for Plasma Etching," Solid State Technology, vol. 26, #4, 4/83, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing with Multimedia Applications," SPIE–The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 1994, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID'99, San Jose, CA, 27 pgs, 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in Al/$Si_3N_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

* cited by examiner

CONTROLLED CURVATURE OF STRESSED MICRO-STRUCTURES

FIELD OF THE INVENTION

The invention relates to controlling curvature in micro-structures. More particularly, the present invention relates to controlling curvature in micro-structures used in micro-electro mechanical machines.

BACKGROUND OF THE INVENTION

A number of micro-machines utilize movable cantilever or ribbon structures. Typically the cantilever or ribbon structures are extremely thin; on the order of hundreds or thousands of Angstroms. These thin micro-structures can experience a high degree of mechanical stress, either during fabrication or during use, which can cause the micro-structures to permanently buckle or bend. The resultant curvatures can reduce the efficiency and/or functionality of the micro-device, especially when the cantilever or ribbon structure is configured to reflect light, such as in the case of a optical MEM device.

One type of optical MEMS that is used to modulate one or more wavelengths of light is disclosed in the U.S. Pat. No. 5,311,360, issued to Bloom et al., which is hereby incorporated by reference. More advanced designs and techniques for making optical MEM devices are described in the U.S. Pat. No. 5,841,579 and the U.S. Pat. No. 5,808,797, both issued to Bloom et al., the contents of which are also both hereby incorporated by reference.

Briefly, optical MEM devices described in the above referenced patent have one or more sets of movable ribbons that comprise a support layer and a reflective top-layer. The support layer is preferably silicon nitride and the reflective top layer is preferably aluminum. Because of the high degree of stress between support layer and the reflective top-layer, the ribbons tend to buckle which significantly reduce the available optical surface area and hence the efficiency of the optical MEM device. Therefore, there is a need for a method of fabricating substantially flat micro structures, such as ribbons and/or cantilevers.

SUMMARY OF THE INVENTION

The current invention is directed to a micro-device comprising at least one suspended micro-structure which is preferably a ribbon structure or cantilever structure, also referred to herein as a release structure. The release structure comprises a silicon-based support layer which is preferably a silicon nitride layer and a reflective top layer that is preferably aluminum. The micro-device is preferably configured to modulate a light with the release structure.

In accordance with the embodiments of the invention, a stress compensating silicon dioxide layer is positioned between the support layer and the top layer. The stress compensating layer helps to control or reduce curvature of the micro structure or release structure.

In a preferred embodiment of the invention, the micro device is an optical MEM which comprises a release structure with plurality of ribbon structures. In accordance with the embodiments of the invention, each of the ribbons has an average width in a range of about 0.5 to about 13 microns and average length in a range of about 10 to about 800 microns. Preferably, alternating ribbons are configured to be selectively moved, relative to stationary ribbons, in order to modulate light.

Each of the ribbons preferably has a silicon-nitride support layer with a thickness in a range of about 800 to about 1200 Angstroms, a reflective top layer with a thickness in a range of about 500 to about 1000 Angstroms and a silicon dioxide compensating layer with a thickness in a range of about 800 to about 8000 Angstroms. Each ribbon can be an individual ribbon or, alternatively, the ribbons are formed as a monolithic comb structure. Regardless of the configuration, the ribbons are preferably coupled to and secured to a support substrate through one or more securing features. The support substrate is preferably a silicon-based wafer.

In accordance with the embodiments of the invention, a compensating layer is selectively formed over regions corresponding to. active regions of the ribbons. Further, the compensating layer can be selectively formed over the central portions of the active regions of the ribbons. In accordance with the embodiments of the invention, the compensating layer thickness can be controlled, such that the height difference between portions of a ribbon with the compensating layer and the portions of the ribbon without the compensating layer corresponds to a distance approximately equal to $n\lambda/2$ (wherein n=a whole number). Accordingly, light that is reflected from portions of the ribbon with the compensating layer and the portions of the ribbon without the compensating layer will be in phase. In yet further embodiments, ribbons or a micro-structures with compensating layers, such as described above, are annealed to further reduce the curvature as described below.

In a preferred embodiment of the invention, a plurality of movable ribbons with compensating layers are encapsulated within a die structure and are electrically coupled to a driver circuit for selectively moving alternating ribbons.

In accordance with a preferred method of the invention, a micro-device is formed from a substrate comprising a device layer, wherein the device layer comprises a silicon-nitride under-layer, a reflective top-layer and a stress compensating silicon dioxide layer therebetween. The release features of the micro-device are patterned from a device layer using a lithographic mask and etch techniques, wherein portions of the underlying substrate are etched away to release the patterned device layer.

The support features for supporting the micro-structures on the substrate, are preferably formed by etching trenches or dimples into the substrate before forming or depositing the device layer. The device layer then fills the trenches or dimples and integrates the device layer into the substrate such that the micro-structures remain attached to the substrate after a subsequent etching process.

DETAILED DESCRIPTION OF THE INVENTION

Figure 1A:
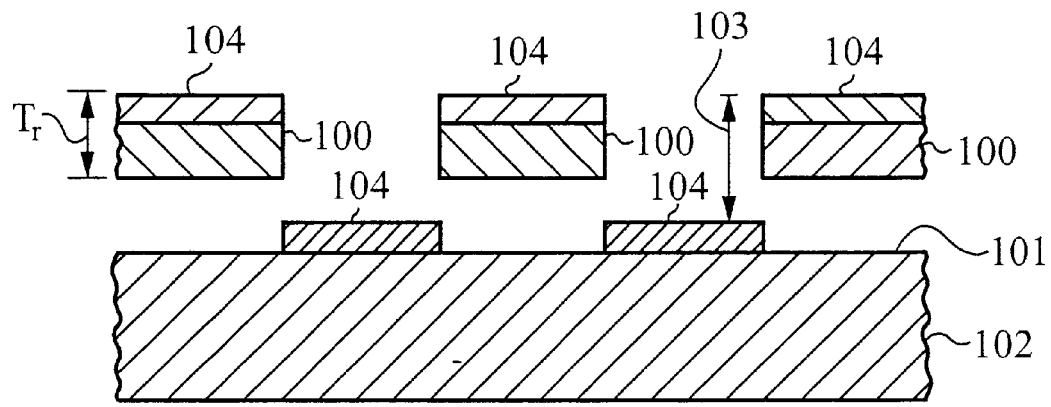
FIGS. 1a–b are cross-sectional representations of a micro-structure comprising a plurality of moveable ribbon structures, in accordance with the embodiments of the invention.

Referring to FIG. 1a, an optical MEM device can have a plurality of movable ribbons 100 that are spatially arranged over a substrate 102. The surfaces 104, corresponding to the ribbon tops and the regions of the substrate between the ribbons, are reflective. The surfaces 104 are made to be reflective by depositing a thin film of reflective material, such as silver or aluminum on the substrate 102 and the ribbons 100. The ribbons and the substrate structure are micro-fabricated from silicon-based materials. The height difference 103 between the reflective surfaces 104 of the substrate 102 and the reflective surfaces 104 of the ribbons 100 are configured to be $\lambda/2$ when the ribbons 100 are in the up position as shown in FIG. 1a. When light having a wavelength $\lambda$ impinges on the compliment of reflective surfaces 104, light that is reflected from the surfaces 104 of the substrate 102 and ribbons 100 will be in phase. Light which strikes the reflective surfaces 104 of the substrate 102 travels $\lambda/2$ further than the light striking the reflective surfaces 104 of the ribbons 100. Then the portion of light that is reflected back from the reflective surfaces 104 of the substrate 102 returns traveling an addition $\lambda/2$ for a total of one complete wavelength $\lambda$. Therefore, the compliment of the reflective surfaces 104 function as a mirror to the incident light source with a wavelength $\lambda$.

Figure 1B:
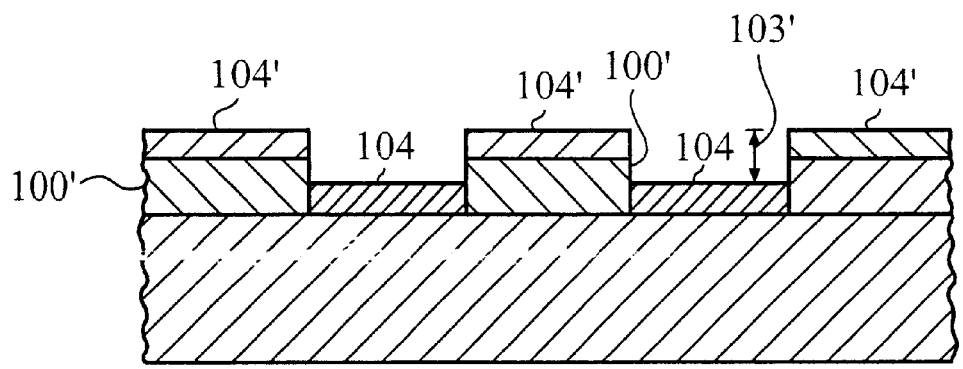

By applying appropriate voltages across the ribbons 100 and the substrate 102, a portion of the ribbons 100 move towards and contact the substrate 102, as shown in FIG. 1b. The thickness $T_T$ of the ribbons 100 is designed to be $\lambda/4$ plus the thickness of the reflective layer 104 such that the distance 103' is also $\lambda/4$. When light having a wavelength $\lambda$ impinges on surfaces 104 and 104' with the ribbons 100 in the down position, as shown in FIG. 1b, the portion of light reflected from the surfaces 104' of the ribbons 100 will be out of phase with the portion of light reflected from the surfaces 104 of the substrate 102, thereby generating the conditions for destructive interference. By alternating the ribbons between the positions for constructive interference, as shown in FIG. 1a, and the positions for destructive interference, as shown in FIG. 1b, the grating light valve is capable of modulating the intensity of reflected light from an impinging light source having a wavelength $\lambda$.

Figure 2A:
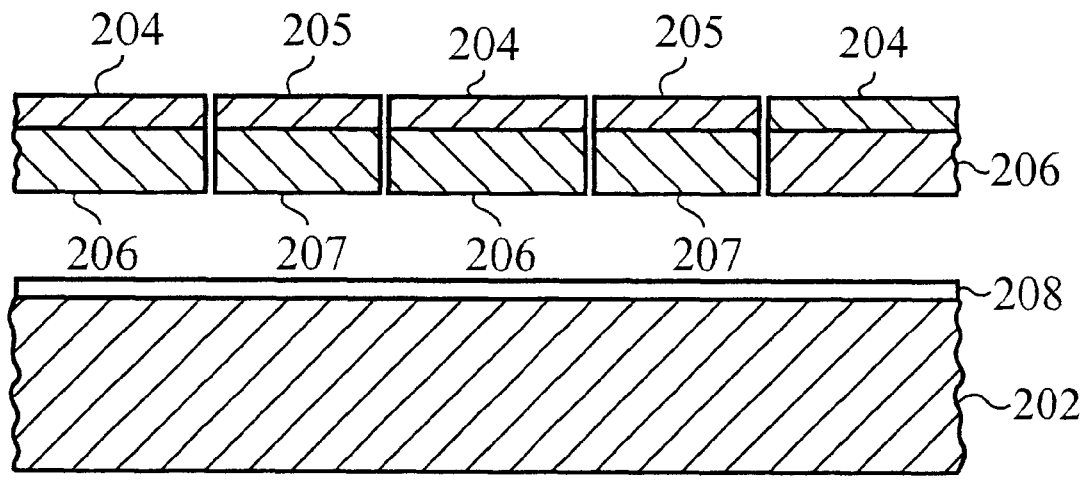
FIGS. 2a–b are cross-sectional representations of a micro-structure comprising two sets of ribbon structures, in accordance with the embodiments of the invention.
Figure 2B:
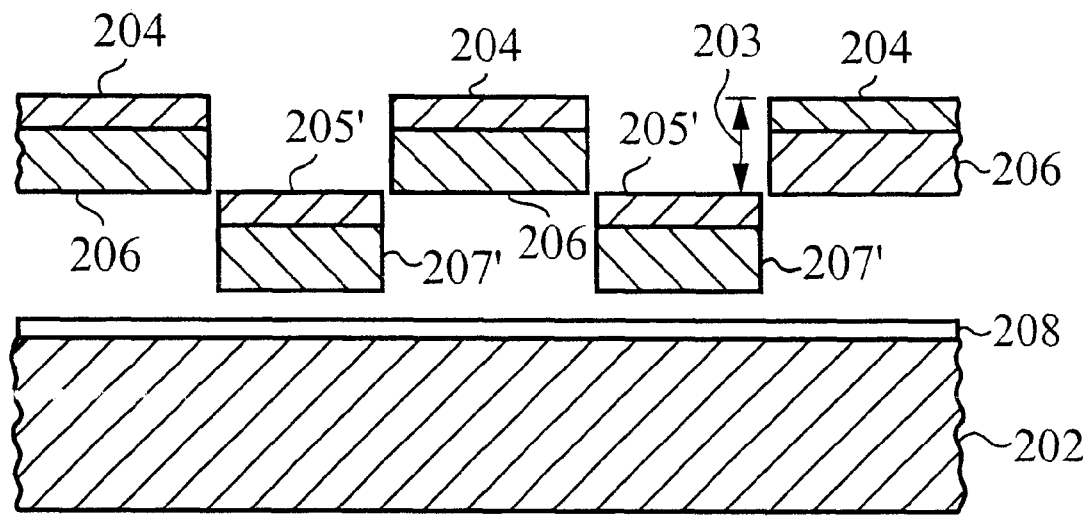

FIGS. 2a–b illustrate cross sectional views of an alternative optical MEM device construction. In accordance with this construction, the optical MEM device has a least two sets of alternating ribbons 206 and 207 that are approximately in the same reflective plane. Referring to FIG. 2a, the ribbons 206 and 207 are suspended over a substrate structure 202. The ribbons 206 and 207 are provided with a reflective surfaces 204 and 205, respectively. Preferably, the surface of the substrate 202, or a portion thereof, also has a reflective surface 208. The reflective surface of the substrate 208 and the reflective surfaces of the ribbons 204 and 205 are preferably configured to be separated by a distance approximately equal to a multiple of $\lambda/2$ of the impinging light source. Thus, the portion of light that is reflected from the compliment of surfaces 204, 205 and 208 are all phase, constructively interfere and the maximum intensity is observed. In operation, the optical MEM device alternates between the conditions for constructive and destructive interference by moving the first set of ribbons 206 or the second set of ribbons 207 relative to each other by a distance corresponding to $\lambda/4$.

In one mode of operation, light is modulated by moving one set of alternating ribbons relative to a stationary set of alternating ribbons. The ribbons that are moved are referred to as the active ribbons and the stationary ribbons are referred to as the bias ribbons. The active ribbons are moved by any number of means including mechanical means, but are preferably moved by applying a sufficient voltage across the active ribbon and the substrate to generate Coulombic attractions between the active ribbons and the substrate.

Now referring to FIG. 2b, when a sufficient voltage is applied across the active of ribbons 207 and the substrate 202, the ribbons 207 are displaced relative to the bias ribbons 206 by a distance 203 that is approximately equal to a multiple of $\lambda/4$. Accordingly, the portions of light that are reflected from the surfaces 205' of the active ribbons 207 will destructively interfere with the portion of light that are reflected of the surfaces 204 of the bias ribbons 206. It will be clear to one skilled in the art that a grating light valve may be configured to modulate an incident light source with a wavelength $\lambda$ in other operative modes. For example, both sets of ribbons 206 and 207 may be configured to move and separate by odd multiples of $\lambda/4$ in order to alternate between the conditions for constructive and destructive interference. In addition, ribbons may or may not contact the substrate during operation.

The ribbons of the MEM devices, described in FIGS. 1a–b and FIGS. 2a–b are preferably hermetically sealed within a die structure. Methods and materials used for providing a hermetically sealed die are described in the U.S. patent application No. 09/124710, filed Jul. 29, 2001, entitled "METHOD OF AND APPARATUS FOR SEALING AN HERMETIC LID TO A SEMICONDUCTOR DIE", now U.S. Pat. No. 6,303,986, the contents of which are hereby incorporated by reference.

Figure 3A:
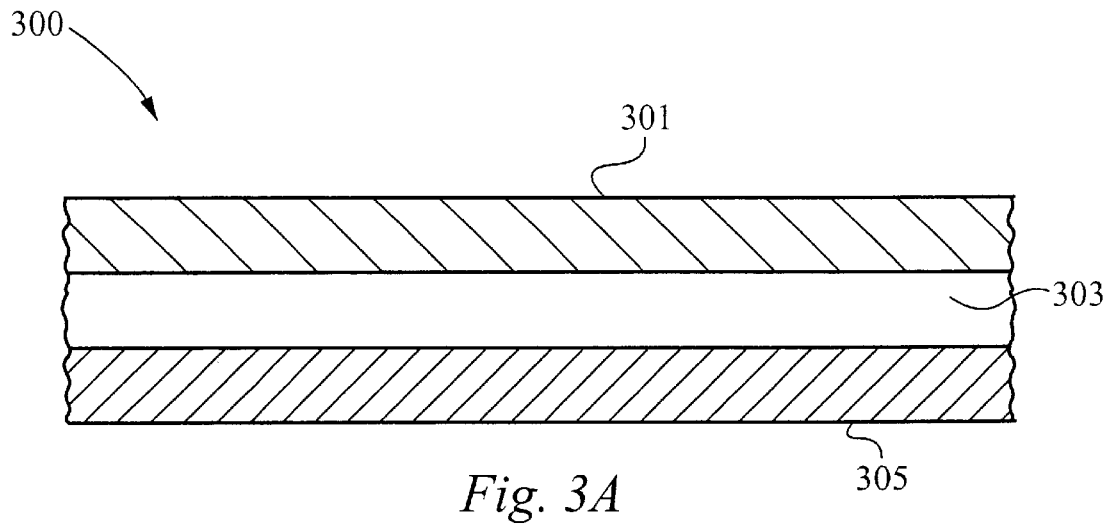
FIG. 3 is a cross-sectional representation of a movable micro-structure, in accordance with the embodiments of the invention.

FIG. 3a shows a cross-sectional view of a portion of a micro-structure 300 formed in accordance with the instant invention. The micro-structure 300 has a silicon based under-layer 305 that is preferably a silicon-nitride under-layer with a thickness in a range of about 800 to about 1200 Angstroms. The micro-structure 300 also has a reflective top-layer 301 that is preferably formed from a metal and has thickness in a range of about 500 to about 1000 Angstroms. The reflective top-layer 301 can be formed from any number of metals and metal alloys, but is preferably formed from aluminum or other metal that can be deposited using sputtering techniques at relatively low; temperatures.

Still referring to FIG. 3a, the micro-structure 300 has silicon dioxide-based compensating layer 303 with a thickness in a range of about 800 to about 1800 Angstroms. The silicon dioxide layer is preferably interposed between reflective top-layer 301 and the under-layer 305, such that silicon dioxide-based compensating layer 303 is in contact with both the reflective top-layer 301 and the under-layer 305. Alternatively, or in addition to the silicon dioxide compensating layer 303, the micro-structure 300 has silicon dioxide-based compensating layer with a thickness in a range of about 800 to about 1800 Angstroms positioned below or underneath the under-layer 305.

Figure 3B:
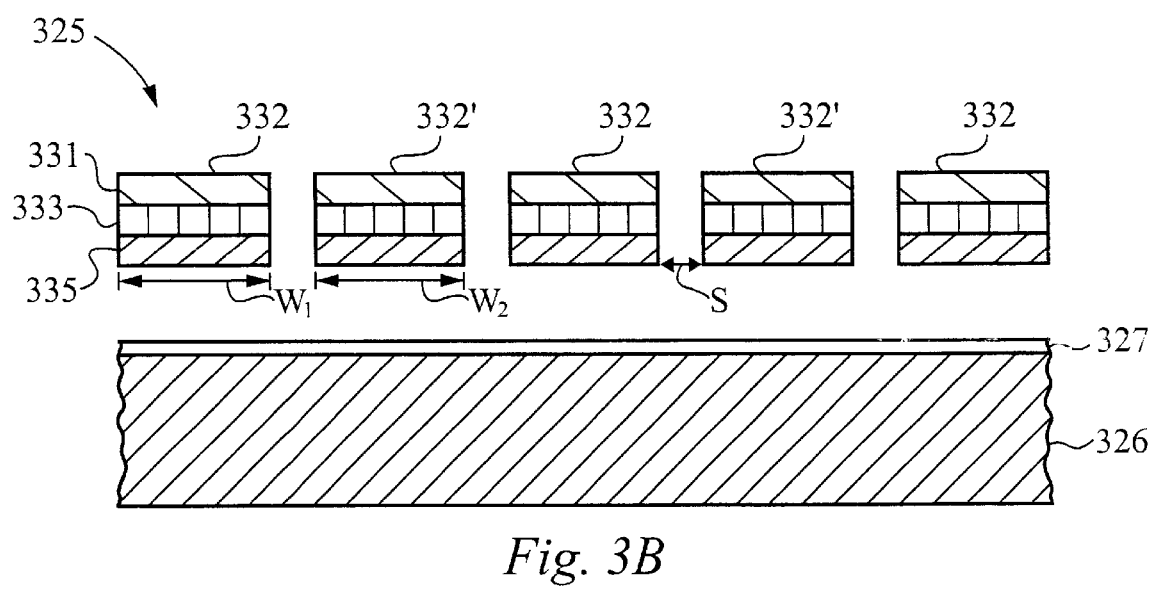

FIG. 3b shows a portion of a micro-device 325, in accordance with the invention. The micro-device 325 preferably has a plurality of ribbon structures 332 and 332' geometrically suspended over a substrate 326. Each of the ribbon structures 332 and 332' preferably has a multi-layer structure comprising an under-layer 335, a top-layer 331 and an compensating layer 333, such as those described above. The plurality of ribbons 332 and 332' can comprise an alternating first set of ribbons 332 and second set of ribbons 332' which are moved relative to each, such as explained above. In accordance with the embodiments of the invention, one set of the ribbons 332 or 332' moves while the other set of ribbons remains stationary. In alternative embodiments, both set of ribbons 332 and 332' move, although by different amounts, so that the relative phase of the light reflected from the ribbons 332 and 332' can be modulated from destructive through to constructive interference.

The substrate 326 can have a layer 327 of reflective material or any other suitable material to assist in the functionality of,the micro-device 325. Also, while the ribbons structures 322 and 322', shown in FIG. 3b, all have uniform widths $W_1$, and $W_2$ and spacings S, any number of ribbons constructions and arrangements with varied widths $W_1$. and $W_2$ and varied spacings S are contemplated. For example, ribbon structure arrangements having varying widths $W_1$ and $W_2$ and optimized spacings S are described in U.S. patent application No. 09/802,619, filed Mar. 08, 2001, entitled "HIGH CONTRAST GRATING LIGHT VALVE", the contents of which is hereby incorporated by reference. Also, while the preferred micro-structure(s) comprises a silicon nitride under-layer, a reflective metal top-layer and a silicon dioxide compensating layer, it is understood that the composition of the nitride under layer, a reflective metal top-layer and a silicon dioxide compensating layer can be varied without departing from the spirit and scope of the invention. For example, the reflective metal top-layer can be formed from an alloy as previously explained and the under-layer and/or the compensating layer may contain impurities and/or dopants such a boron, phosphorus and the like.

Figure 4:
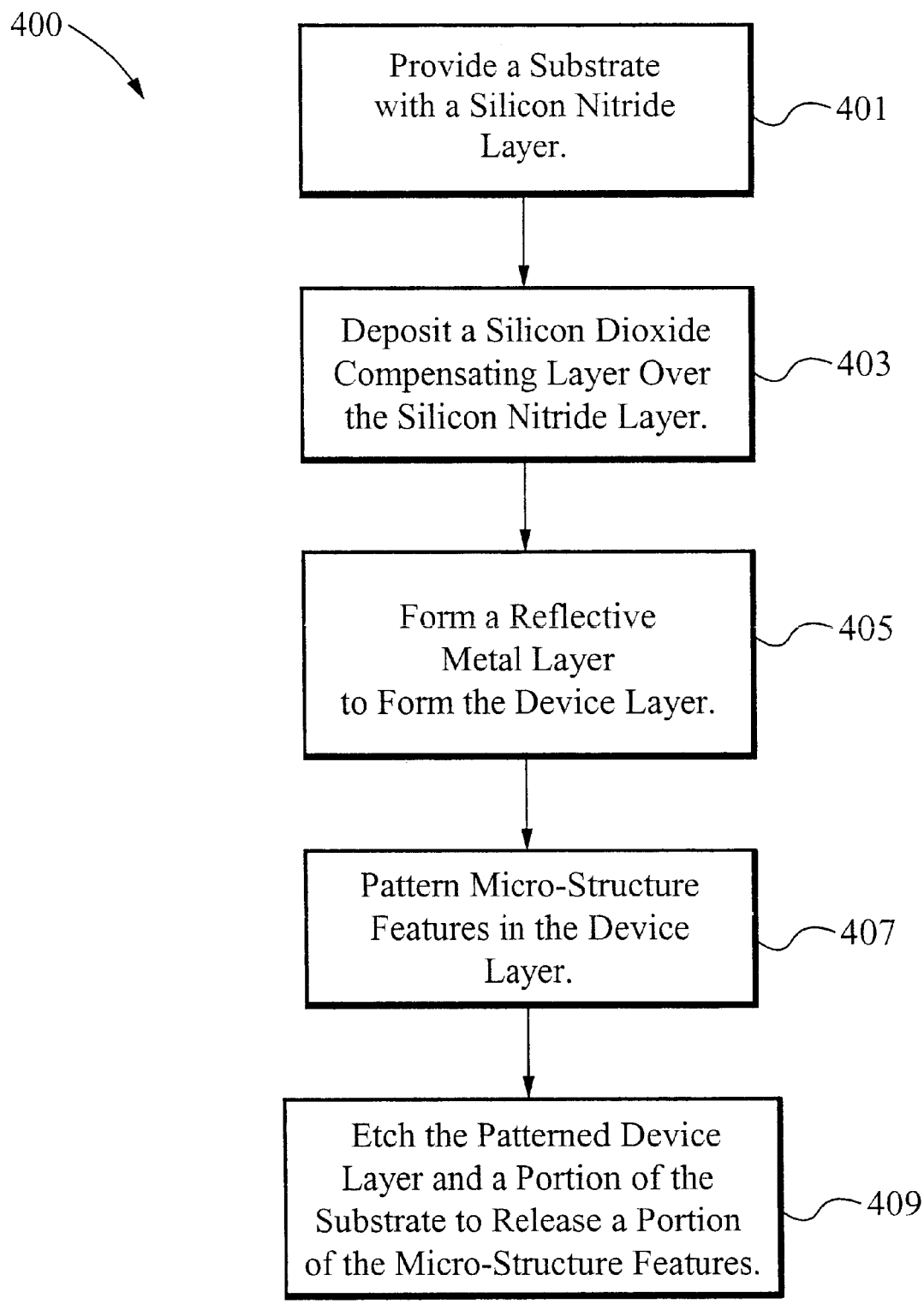
FIG. 4 is a schematic block-diagram outlining the steps for making a micro-device with movable micro-structures, in accordance with the embodiments of the invention.

FIG. 4 shows a block diagram 400 outlining steps for making a micro-device with one or more movable micro-structure(s), in accordance with the embodiments of the invention. In the step 401, a substrate having a nitride-based layer is provided. Preferably, the substrate is a silicon-based substrate that is capable of being selectively etched away from the nitride-based layer. The nitride-based layer can be formed on the silicon-based substrate using any number of deposition techniques known in the art. After the substrate with the nitride-based layer is provided in the step 401, then in the step 403 a low stress, or stress compensating, silicon dioxide-based layer is formed over the silicon nitride-based layer. In the step 403, the silicon dioxide-based layer is form-ed using any number of deposition techniques, including thermal deposition and thermal growth techniques. After the silicon dioxide-based layer is formed in the step 403, then in the step 405 a reflective top-layer is formed over the silicon dioxide-based layer, thereby forming a device layer.

In alternative embodiments of the invention, a low stress or stress compensating silicon dioxide-based layer is deposited on the substrate, prior to forming a silicon-nitride layer and a reflective top layer. In yet further embodiments, a silicon dioxide-based layer is formed on the substrate below a silicon nitride-based layer and between the silicon nitride-based layer and a reflective top layer.

After the device layer is formed. in steps 401 through 405, then in the step 407 the device layer is patterned with micro-structure features. In the step 407, the device layer is patterned with the micro-structure features using any number of lithographic masking and patterning techniques known in the art. After the device layer is patterned in the step 407, then in the step 409 a portion of the patterned device layer is etched to release patterned micro-structures in the device layer. Preferably, the portion of the device layer is etched away from the underlying substrate using a dry etc processes, such as those described in the U.S. patent application Ser. No. 09/952,626, entitled MICRO-ELECTRONIC MECHANICAL SYSTEM AND METHODS, filed Sep. 13, 2001, the contents of which is hereby incorporated by reference.

Figure 5A:
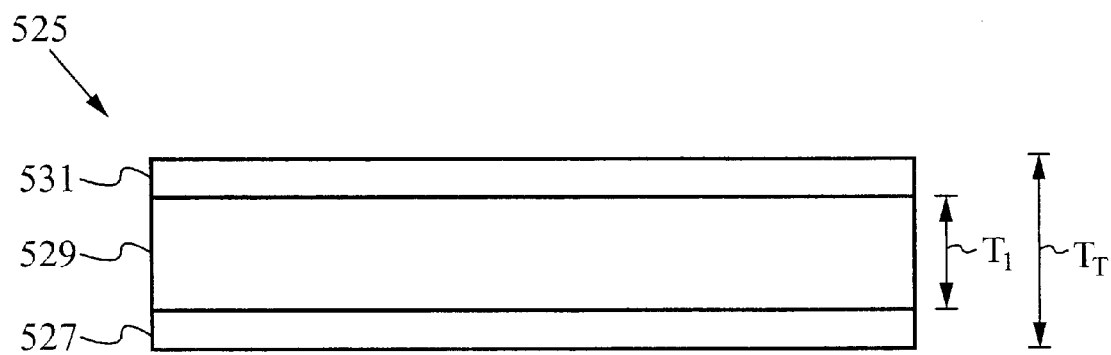
FIG. 5a is a cross section representation of a ribbon with a compensating layer sandwiched between an aluminum top layer and a silicon nitride under layer.

FIG. 5a shows a cross-sectional view of a ribbon structure 525 with an aluminum top layer 531, a silicon nitride under layer 527 and a silicon dioxide compensating layer 529 therebetween. The thickness of the layer 531, 529 and 527 can be varied in a number of ways to modify the curvature of the ribbon structure 525. Preferably, the thickness $T_1$ of the compensating layer 529 is sufficient to minimize or reduce curvature observed in the ribbon structure 525, while the total thickness $T_T$ of the ribbon structure 525 remains small enough to allow the ribbon structure 525 to deflect when a sufficient voltage is applied across the ribbon structure 525 and a substrate (not shown) coupled to the ribbon.

Figure 5B:
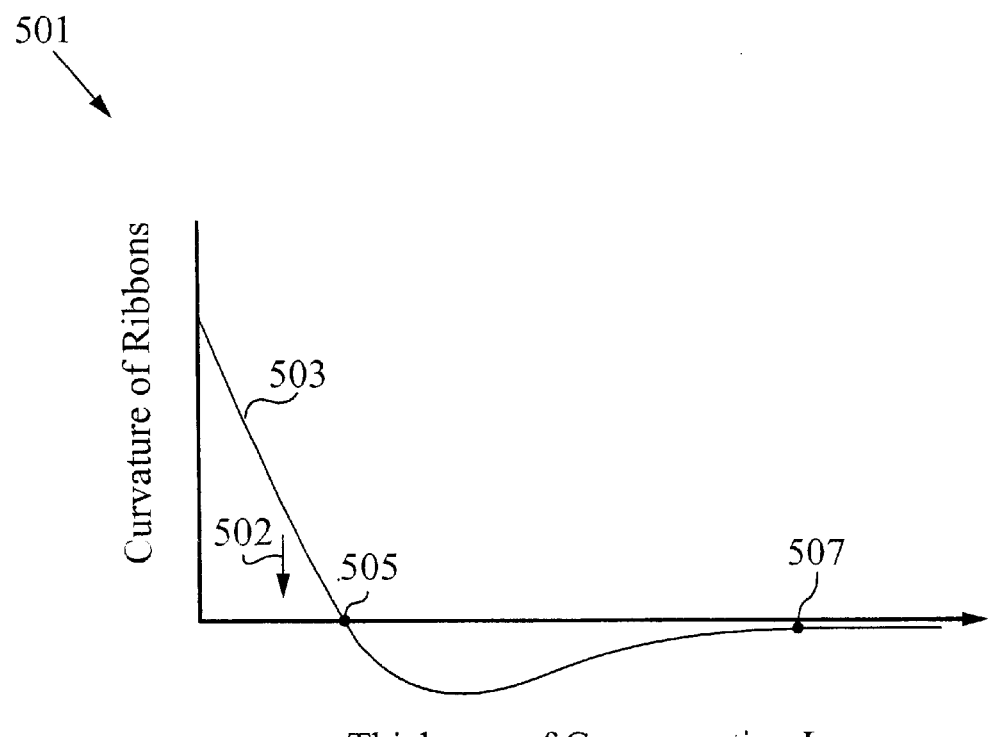
FIG. 5b plots the cross sectional curvature of ribbon as a function of compensating layer thickness.

FIG. 5b is a graph 501 which plots the observed curvature of the ribbon structure 525 as a function of the compensating layer 529 thickness $T_1$ (FIG. 5a), while the reflective top layer 531 and the under layer 527 remain substantially constant. From the curve 503, it can be seen that the curvature of the ribbon structure 525 passes through a minimum at a thickness $T_1$ corresponding to 505. As the thickness of the compensating layer 529 is further increased, the ribbon structure 525 will passes through the zero point 505 and curve in the opposite direction. As the thickness of the compensating layer 529 is increased even further, the ribbon structure 525 again flattens out to have curvature at point 507. Any further increases in the thickness of the compensating layer 529 has little or no effect on the curvature of the ribbon structure 525.

Still referring to FIGS. 5a–b and the discussion above, it would appear that the best way to eliminate curvature in the ribbon structure 525 would be to make the compensating layer 529 to have a thickness corresponding to the point 507 or greater. However, in practice it is not preferable to make a compensating layer 529 with a thickness corresponding to the point 507 or greater, because the resultant ribbon structure 525 will likely be too stiff. As a result the ribbon structure will not be responsive to typical voltages used to move the ribbon 525.

Still referring to FIG. 5b, it has been discovered that a ribbon structure) such as ribbon 525, with compensating layer having a compensating layer 525 corresponding to thickness less than the point 505 on the curve 503 can be annealed to further reduce the observed curvature of the ribbon structure 525. The annealing process irreversibly reduces curvature, as indicated by the arrow 502, without requiring a thick compensating layer 529.

Figure 6A:
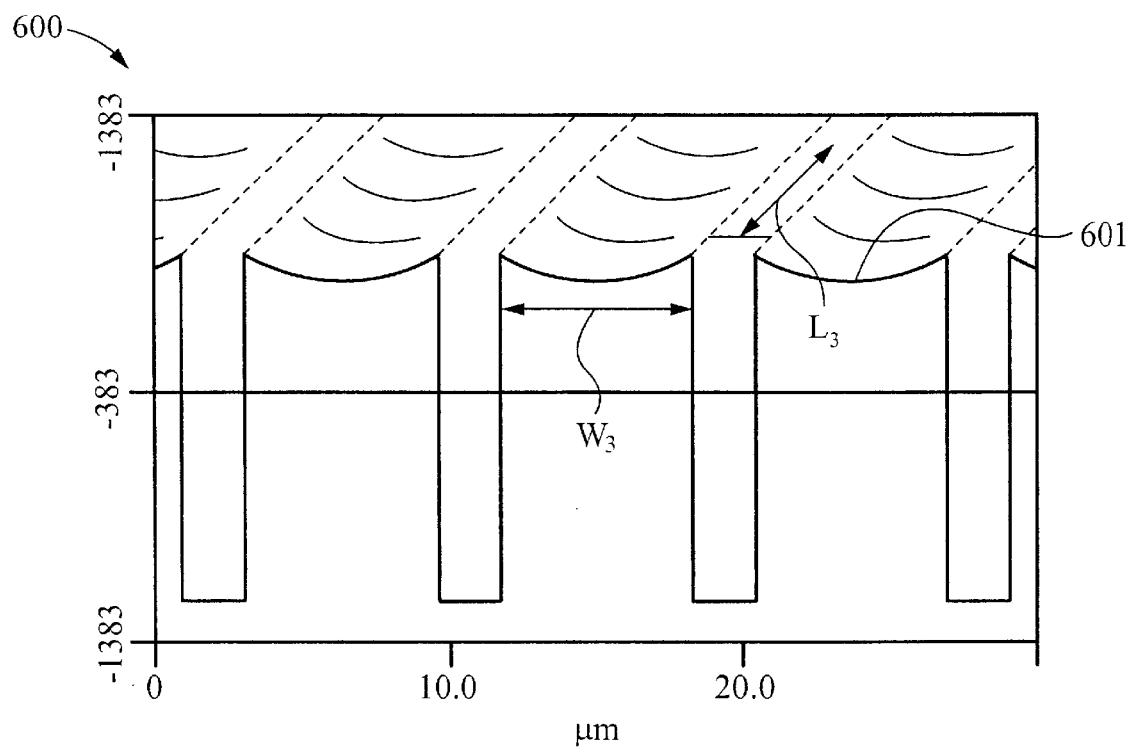
FIGS. 6a–b are graphical representations of the cross-sectional curvature of ribbon structures formed without a silicon dioxide compensating layer and ribbon structures formed with a silicon dioxide compensating layer, respectively.

FIG. 6a shows a cross-sectional profile 600 of a micro-device comprising a plurality of ribbons formed from a device layer comprising a silicon nitride layer and a reflective aluminum top-layer, but without the silicon dioxide compensating layer, as described above. The line 601 corresponds to a profile of the ribbons across their widths, as indicated by the width $W_3$, which is substantially perpendicular their lengths, indicated by the length $L_3$. From the profile line 601, it is clear that each ribbon structure has a significant degree of curvature which can greatly reduces the effective reflective surface area and hence the ability and efficiency of the micro-device with such ribbons to modulate light, especially with respect to polarization dependence losses.

Figure 6B:
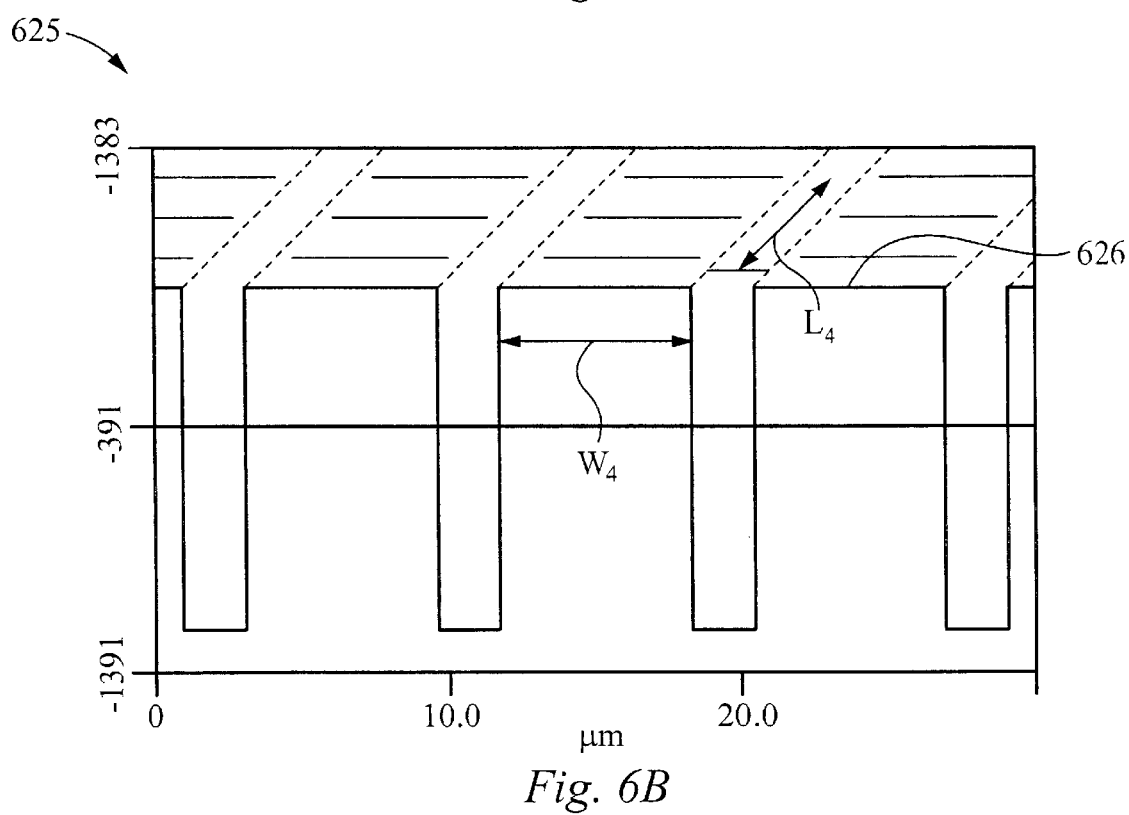

FIG. 6b shows a cross-sectional profile 625 of a micro-device comprising a plurality of ribbons formed from a silicon nitride layer, an aluminum reflective top-layer, and a silicon dioxide compensating layer, in accordance with the embodiments of the invention. The line 626 corresponds to a profile across their widths, as indicated by the width $W_4$, which is substantially perpendicular to the lengths, as indicated by the length $L_4$. From the profile line 626, it is clear that each of the ribbons exhibit a very low degree of curvature, hence maximizing the effective reflective surface area of each ribbon and enhancing the ability and efficiency of the microdevice with such ribbons to modulate light. The cross-sectional profiles shown in FIG. 6a–b, were generated using standard atomic force microscopy techniques.

Figure 7A:
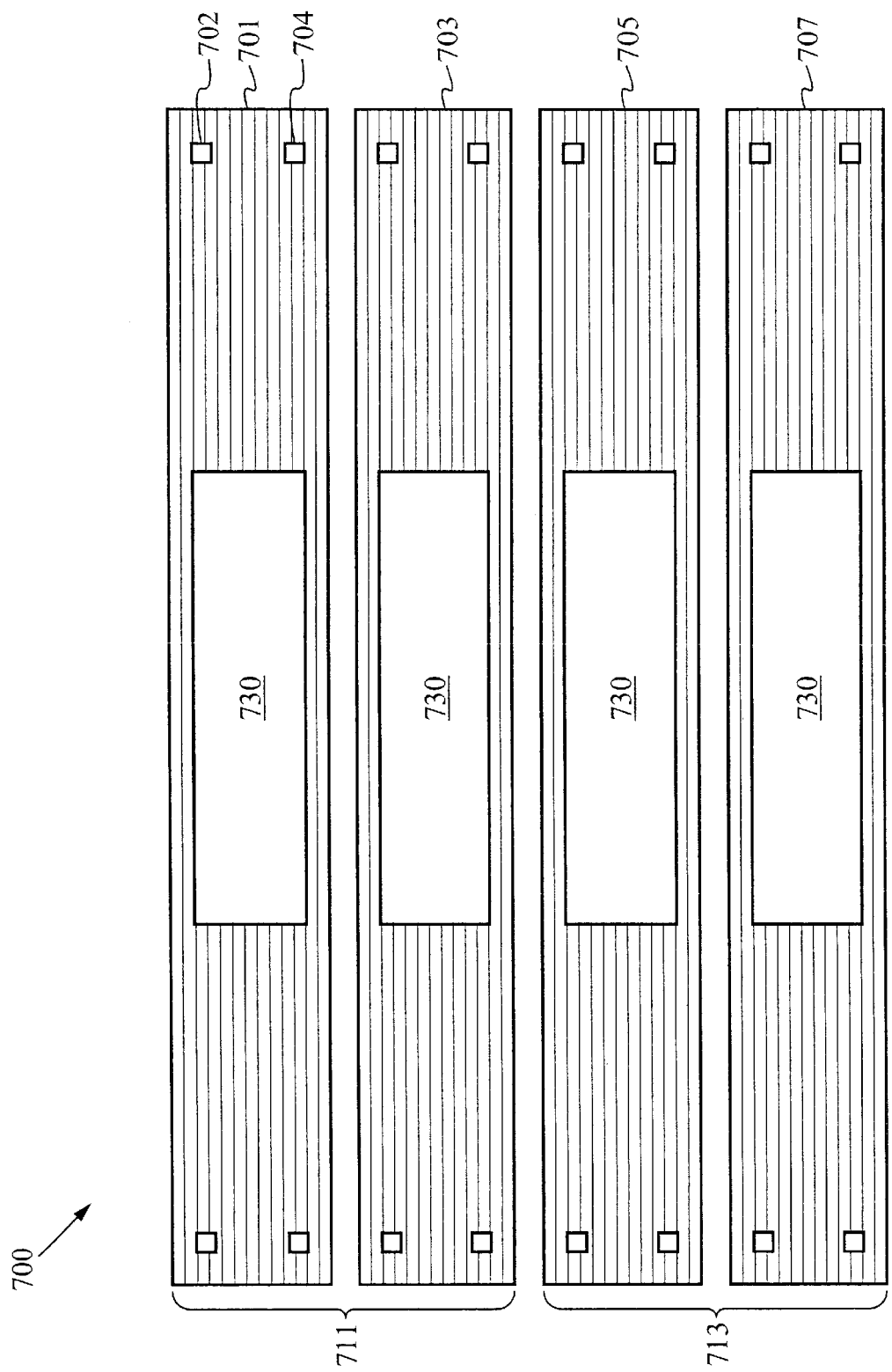
FIG. 7a is a top view of ribbons with a compensating layer selectively formed on the central portion of the ribbon, in accordance with the embodiments of the invention.

Referring now to FIG. 7a, a device in accordance with the embodiment of the invention comprises an array of ribbons 700 comprising ribbon pairs 711 and 713. The ribbon pairs 711 and 713 comprise ribbons 701/703 and 705/707 configured to move with respect to each other to modulate light, as described above. Each of the ribbons 701, 703, 705 and 707 are preferably coupled to a substrate (not shown) through one or more anchor or post feature 702 and 704, as described below. Each of the ribbons 701, 703, 705 and 707 preferably have a central active region 730 comprising a compensating layer.

Figure 7B:
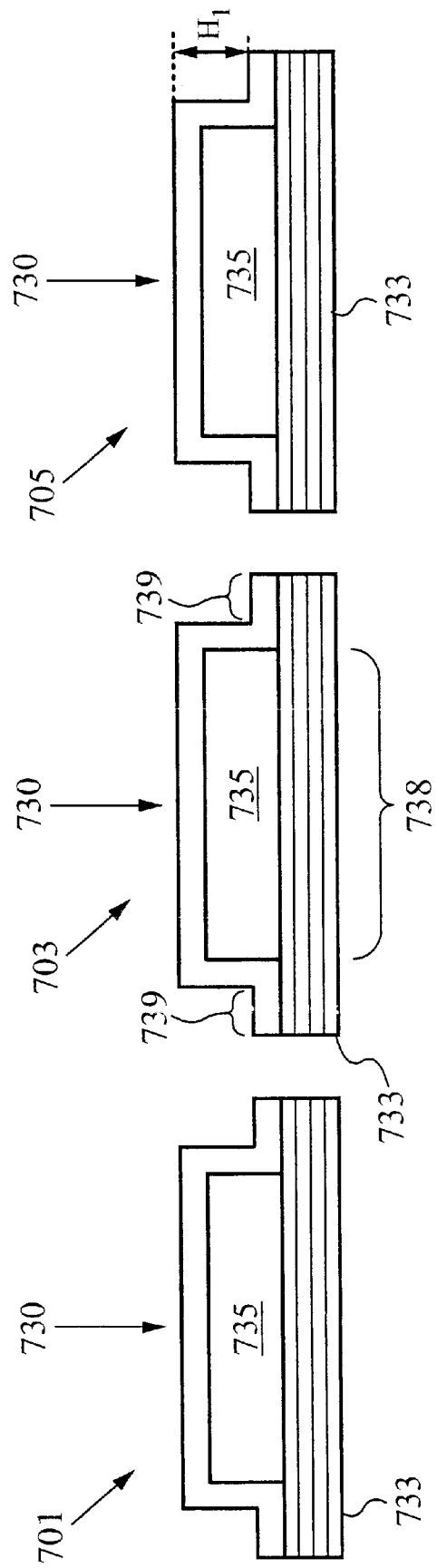
FIG. 7b is a cross-sectional view of the ribbons shown in FIG. 7a having compensating layers, in accordance with the embodiments of the invention.

FIG. 7b shows cross sectional representation of the ribbons 701, 703 and 705 shown in FIG. 7a, in accordance with the embodiments of the invention. A compensating layer 735 is selectively formed on central portions 738 of the active regions 730 of the ribbons 701, 703, 705.

In accordance with the embodiments of the invention, the compensating layer thickness can be controlled, such that the height difference $H_1$ between the portions of the ribbons 738 with the compensating layer 735 and the portions of the ribbons 739 without the compensating layer 735 corresponds to a distance approximately equal to $n\lambda/2$. Accordingly, light that is reflected from the portions of the ribbons 738 with the compensating layer 735 and the portions of the ribbons 739 without the. compensating layer 735 will be in phase.

FIG. 8 a shows a top view of a micro-device 800 in the plane of the arrows 821 and 823. The micro-device 800 comprises a chip with one or more comb structures 807 and 809. Each of the comb structures 807 and 809 has a plurality of ribbon micro-structures formed from a device layer, as described in detail above. The comb structures 807 and 809 are preferably electrically coupled to a circuit 811, also on the chip 801 and configured for selectively moving the ribbons of the comb structures 807 and 809. Preferably, the comb structures 807 and 809 are coupled to and/or secured to the chip 801 through securing features 805. The micro-device 800 also preferably has a sealing region 803 around the comb structures 807 and 809 for receiving a sealing a lid, as described in detail below.

Figure 8A:
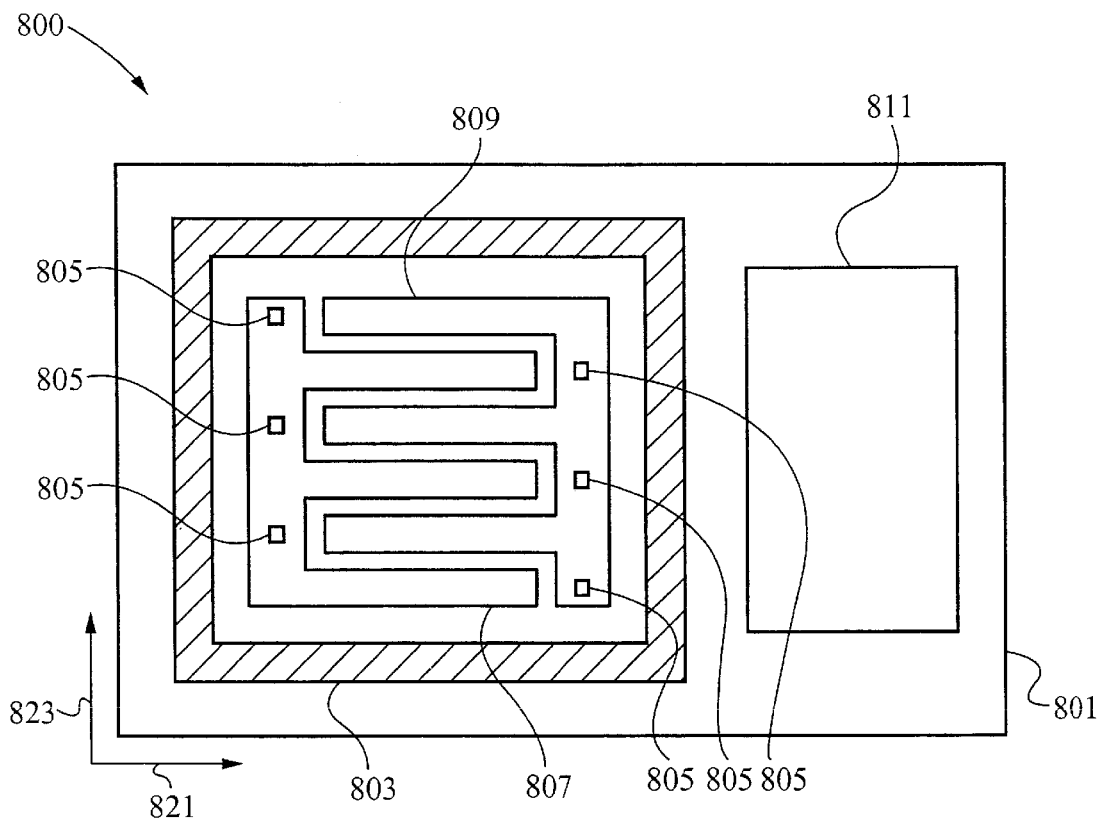
FIG. 8a shows a schematic top-view of a MEM device comprising comb structures with movable ribbons, in accordance with alternative embodiments of the invention.
Figure 8B:
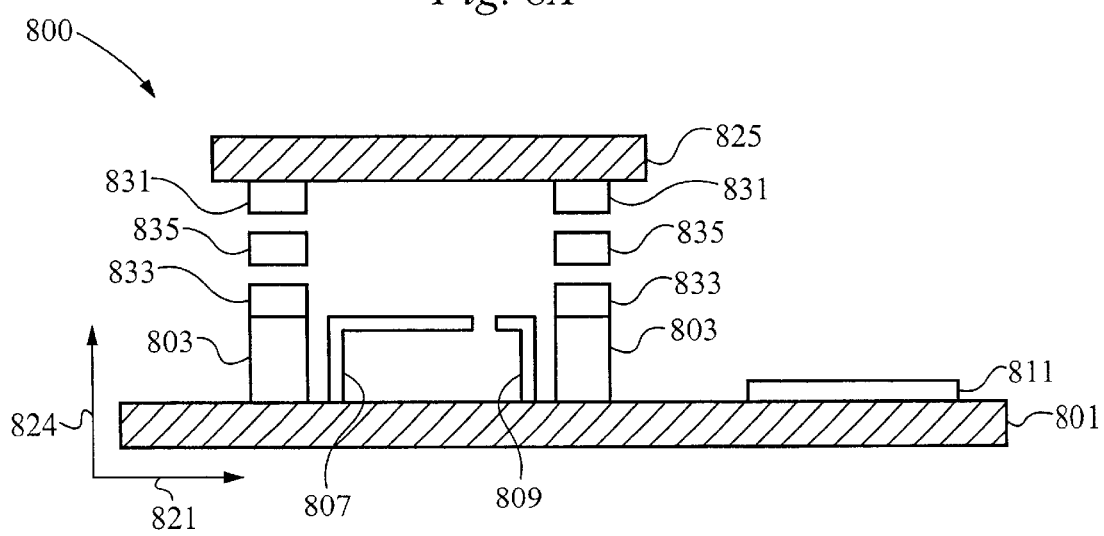
FIG. 8b shows a cross-sectional view of the MEM device shown in FIG. 8a, and illustrates a method for sealing the comb structures within a die structure, in accordance with the method of the invention.

FIG. 8b illustrates a side view of the micro-device 800 shown in FIG. 8a, in the plane of the arrows 821 and 824, which is orthogonal with the plane 821 and 823. From the side view shown in FIG. 8b, it can be seen that the comb structures 807 and 809 are suspended above the surface of the chip 801. The sealing region 803, as shown, is preferably raised to hold lid 825 above the suspended comb structures 807 and 809 with the lid 825 sealed to the sealing region 803 of the chip 801. The lid 825 is preferably formed from glass, silicon or other material(s) suitable for the application at hand. Preferably, the lid 825 is transparent to one or more wavelength of light to be modulated.

In order to seal the lid 825 to the sealing region 803 of the chip 801, the sealing region 803 is preferably provided with a sealing ring 833 and the lid 825 is provided with a complementary sealing ring 831. The sealing rings 831 and 833 allow a solder material 835 that is placed between the sealing rings 831 and 833 to flow and wet the surfaces of the sealing rings 831 and 833, thus providing a hermetic seal between the lid 825 and the sealing region 803. The sealing rings 831 and 833 can be made from a single layer of chromium and/or gold or, alternatively, can be a multiple layer sealing ring formed from layers of chromium and gold. For example, the sealing rings 831 and 833 can comprise inner layers of chromium that are approximately 300 Angstroms thick, formed against the lid and the sealing region, and outer lays of gold that are approximately 10,000 Angstrom thick, formed over the chromium layers. The solder layer 835, used with gold and chromium based sealing rings, such as described above, is preferably a 80 Au/20 Sn solder amalgam that is approximately 50 microns thick. Other methods of forming sealing rings and compositions of sealing rings are described in the U.S. Pat. No. 6,303,986, referenced previously.

Figure 9A:
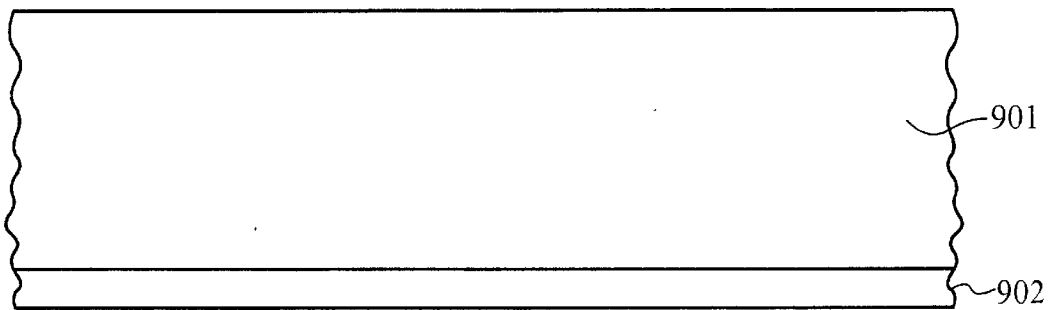
FIGS. 9a–e, show forming a device layer on a silicon layer that is patterned with trench features for forming support structures, in accordance with the embodiments of the invention.
Figure 9B:
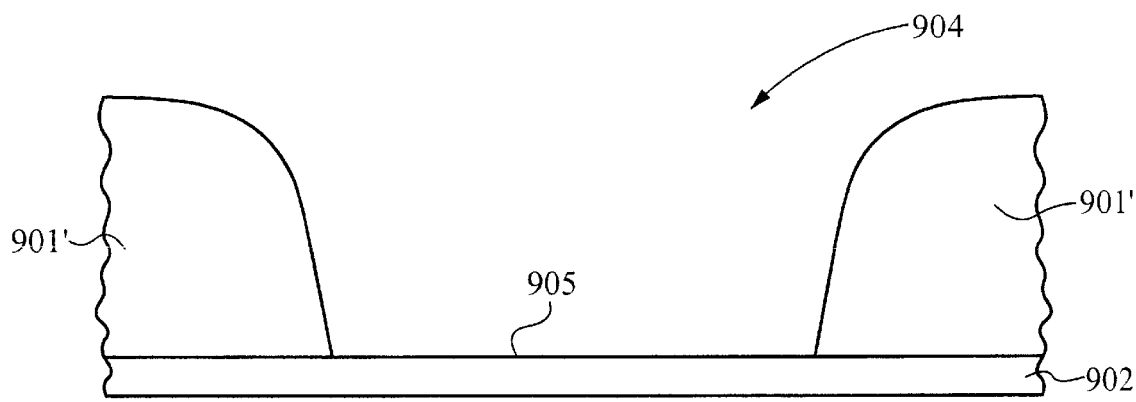
Figure 9C:
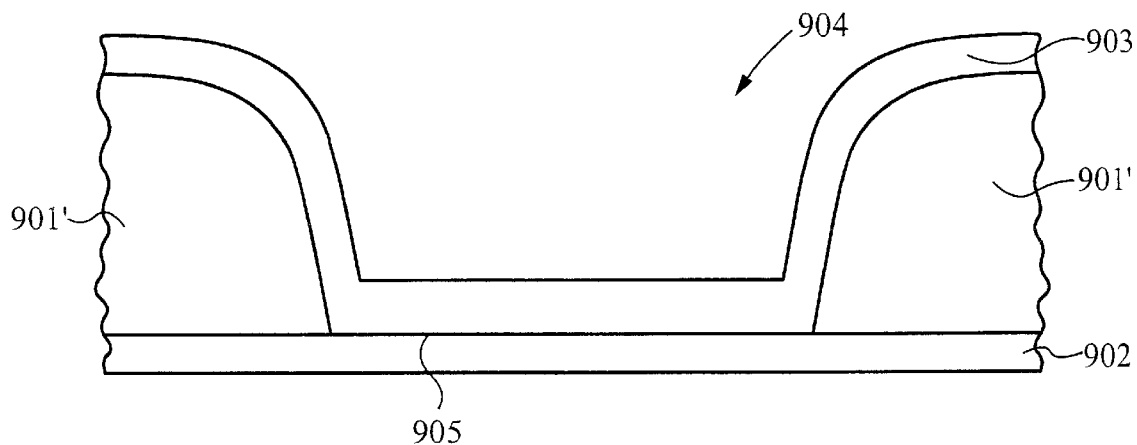

FIGS. 9a–e will be used to illustrate the formation of an anchor support feature or a post support feature, such as those schematically shown in FIG. 7a. Referring to FIG. 9a, a layer 901 of sacrificial material, such as poly-silicon, is deposited onto a suitable substrate structure 902, which preferably comprises an oxide layer, as explained in detail below. The sacrificial layer 901 is etched to form a patterned sacrificial layer 901' that is patterned with a support trench or a support dimple 904 as shown in FIG. 9b. The sacrificial layer 901 is preferably etched such that a portion of the substrate surface 905 is exposed and, thereby, is available for coupling with a device layer 903, as shown in FIG. 9c and described in detail below.

After the support trench or dimple 904 is formed, then the device layer 903 is formed over the patterned sacrificial layer 901'. such that a portion of the device layer 903 is formed over the exposed surface of the substrate 905 and through the support trench or dimple 904, thereby forming a support features. The device layer 903 preferably comprises silicon nitride and can also comprise one or more layers of silicon oxide and/or a reflective top layer,as described in detail below.

Figure 9D:
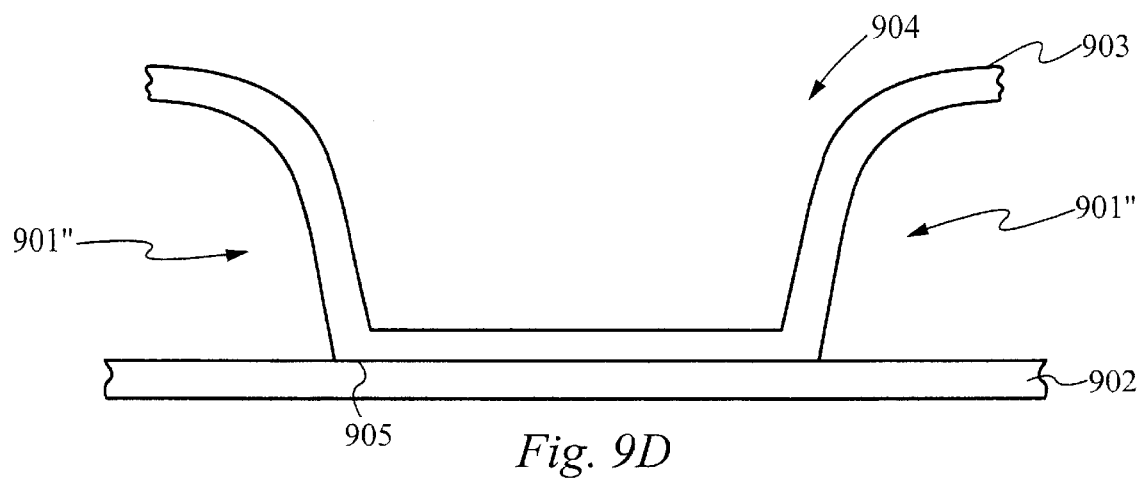
Figure 9E:
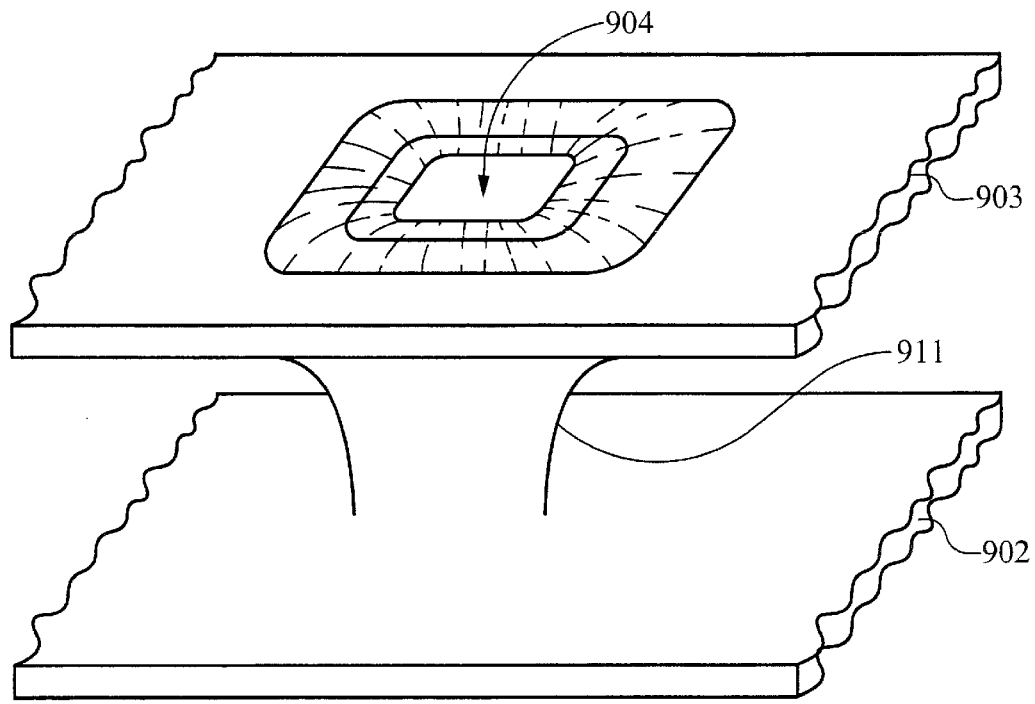

Now referring to FIG. 9d, after the device layer 903 is formed, then the patterned sacrificial layer 901' is etched, or partially etched, to form voids or gaps 901" and release the device layer 903, which remains coupled to the substrate 902 through the support feature formed in the support trench 904. Preferably, the patterned sacrificial layer 901' is etched using a dry etch process, such as described in the U.S. patent application Ser. No. 09/952,626, entitled MICRO-ELECTRONIC MECHANICAL SYSTEM AND METHODS, filed Sep. 13, 2001, the contents of which is hereby incorporated by reference. In a preferred method of the invention, the device layer 903 is cut or divided into ribbon structures prior to etching the patterned sacrificial layer 901', whereby each of the released ribbon structures remain coupled to the substrate 902 through support regions comprising a plurality of anchor support features and a plurality of post support features. FIG. 9e shows a perspective view of an anchor or a post feature 911 coupled to the substrate 902, and supporting the released device layer 903 formed in accordance with the method described above.

While current designs of grating light valves have improved their operating efficiency and reliability, there is continued need to further optimize grating light valve devices for use in display, print, optical and electrical device technologies. Typically after the ribbons structures are formed in a grating light valve structure, the movable ribbon structures are exposed to one or more processes which require thermal cycling. For example, a grating light valve structure may be sealed within a die structure using solder materials which requires elevated temperatures. The invention provides a method of the fabricating stressed movable micro-structures with reduces curvature, which can result during the processing of the movable micro-structures.

The present invention has been described in terms of specific embodiments incorporating details to facilitate the understanding of the principles of construction and operation of the invention. While the preferred micro-device of the invention is an optical MEMS device, the invention is contemplated to be useful for making any number of micro-structure and microstructure devices including cantilever devices. As such references, herein to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A micro-device comprising at least one suspended ribbon structure comprising a silicon-based under-layer, a metal top-layer and a ceramic compensating layer positioned between the silicon-based support layer and the metal top-layer.

2. The micro-device of claim 1, wherein the silicon-based under-layer comprises silicon nitride.

3. The micro-device of claim 1, wherein the metal top-layer comprises metal selected form the group comprising aluminum, silver and gold.

4. The micro-device of claim 1, wherein the silicon-based under-layer has a thickness in a range of about 800 to about 1200 Angstroms.

5. The micro-device of claim 1, wherein the ceramic compensating layer has a thickness in a range of about 800 to about 1200 Angstroms.

6. The micro-device of claim 1, wherein the metal top-layer has a thickness in a range of about 500 to 1000 Angstroms.

7. The micro-device of claim 1, wherein the at least one suspended ribbon structure is coupled to a substrate.

8. The micro-device of claim 7, wherein the at least one suspended ribbon structure is coupled to the substrate through one or more post features.

9. The micro-device of claim 1, wherein the at least one suspended ribbon structure is an elongated ribbon structure having an average width in a range of about 0.5 to about 13 microns.

10. A MEMS comprising a release structure comprising a plurality of movable ribbons each comprising a bottom layer of silicon-nitride, a top-layer of reflective metal and a middle layer of ceramic material.

11. The MEMS of claim 10, further comprising a die structure wherein the release structure is encapsulated within the die structure.

12. The MEMS of claim 10, wherein the bottom layer has thicknesses in a range of about 800 to about 1200 Angstroms.

13. The MEMS of claim 10, wherein the middle layer has a thicknesses in a range of about 800 to about 1200 Angstroms.

14. The MEMS of claim 10, wherein the top-layer has thicknesses in a range of about 500 to about 1000 Angstroms.

15. The MEMS of claim 10, further comprising a wafer substrate with an integrated circuit electrically coupled to the release structure.

* * * * *

UNITED STATES PATENT AND TRADEMARK OFFICE
CERTIFICATE OF CORRECTION

PATENT NO. : 6,712,480 B1   Page 1 of 1
DATED : March 30, 2004
INVENTOR(S) : Leung et al.

It is certified that error appears in the above-identified patent and that said Letters Patent is hereby corrected as shown below:

Column 9,
Line 47, after "silicon-based", replace "under-layer" with -- support layer --

Column 10,
Lines 4-5 and 9-10, after "silicon-based", replace "under-layer" with -- support layer --

Signed and Sealed this

Twenty-third Day of November, 2004

JON W. DUDAS
*Director of the United States Patent and Trademark Office*